(12) United States Patent
Lee

(10) Patent No.: US 6,315,571 B1
(45) Date of Patent: Nov. 13, 2001

(54) SLIPPER WITH MUSICAL AND RHYTHMIC STIMULATION

(75) Inventor: Min Joo Lee, Seoul (KR)

(73) Assignee: Chosun International, Inc., New York, NY (US)

( * ) Notice: Subject to any disclaimer, the term of this patent is extended or adjusted under 35 U.S.C. 154(b) by 0 days.

(21) Appl. No.: 09/437,282

(22) Filed: Nov. 10, 1999

Related U.S. Application Data

(60) Provisional application No. 60/113,393, filed on Dec. 23, 1998, and provisional application No. 60/108,305, filed on Nov. 13, 1998.

(51) Int. Cl.[7] ................................................. A63B 69/00
(52) U.S. Cl. ......................... 434/250; 434/247; 434/258; 84/600; 84/464 R; 84/470 R; 84/468; 362/103
(58) Field of Search ..................... 601/46; 84/600, 84/464 R, 468, 470 R, 465; 362/103; 434/247, 250, 258, 255, 307 R, 307 A, 308, 309, 365; 482/3, 74, 479, 900

(56) References Cited

U.S. PATENT DOCUMENTS

| 4,571,680 | * | 2/1986 | Wu ................................. 377/24.2 X |
| 4,703,445 | * | 10/1987 | Dassler ............................ 702/160 X |
| 4,776,323 | * | 10/1988 | Spector ............................. 601/23 X |
| 4,845,865 | | 7/1989 | Chang et al. . |
| 5,461,188 | | 10/1995 | Reilly . |
| 5,500,635 | * | 3/1996 | Mott ............................. 340/323 R X |
| 5,529,498 | * | 6/1996 | Cassily et al. .................. 434/258 X |
| 5,529,499 | * | 6/1996 | Martinez ......................... 434/258 X |
| 5,592,759 | | 1/1997 | Cox . |
| 5,732,486 | | 3/1998 | Rapisarda . |
| 5,743,744 | * | 4/1998 | Cassily et al. .................. 434/258 X |
| 5,746,499 | | 5/1998 | Ratcliffe et al. . |
| 5,758,946 | | 6/1998 | Chen . |
| 5,836,899 | | 11/1998 | Drago . |
| 5,897,457 | * | 4/1999 | Mackovjak ......................... 482/8 X |
| 5,945,911 | * | 8/1999 | Healy et al. ...................... 340/573.1 |

* cited by examiner

Primary Examiner—Valencia Martin-Wallace
Assistant Examiner—Chanda Harris
(74) Attorney, Agent, or Firm—Handal & Morofsky

(57) ABSTRACT

A training shoe is disclosed. The shoe, preferably a soft shoe such as a slipper is designed to emit audio and/or physical stimuli which assists the user in learning dance or other steps. The shoe comprises electromechanical members which are responsive to electrical output signals to control movement to guide a user to perform the appropriate dance steps. In preferred embodiments, the shoe also comprises a loudspeaker through which music is played. In alternate embodiments, the electromechanical members are responsive to audio stimuli such as the music from the loudspeaker on the shoe or from other musical sources.

18 Claims, 4 Drawing Sheets

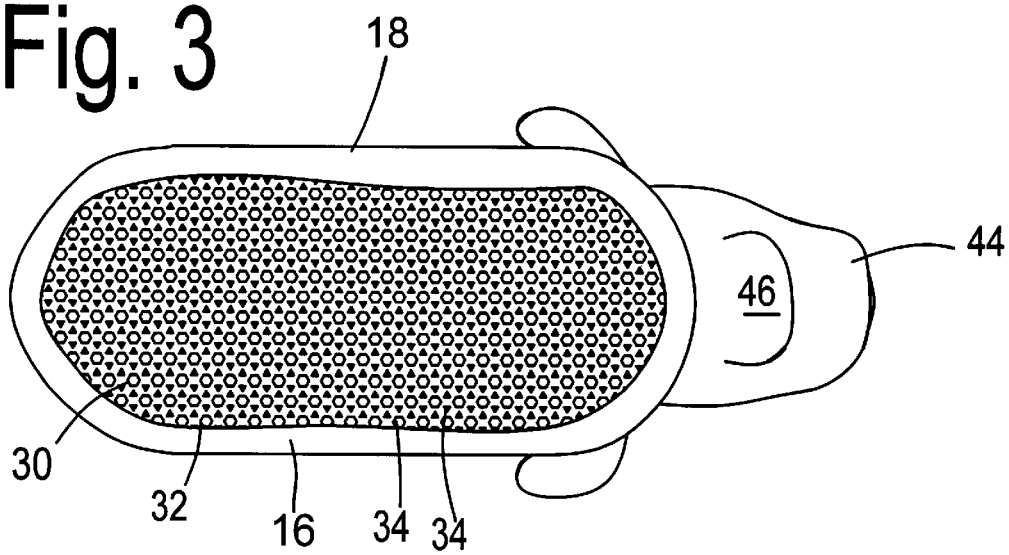
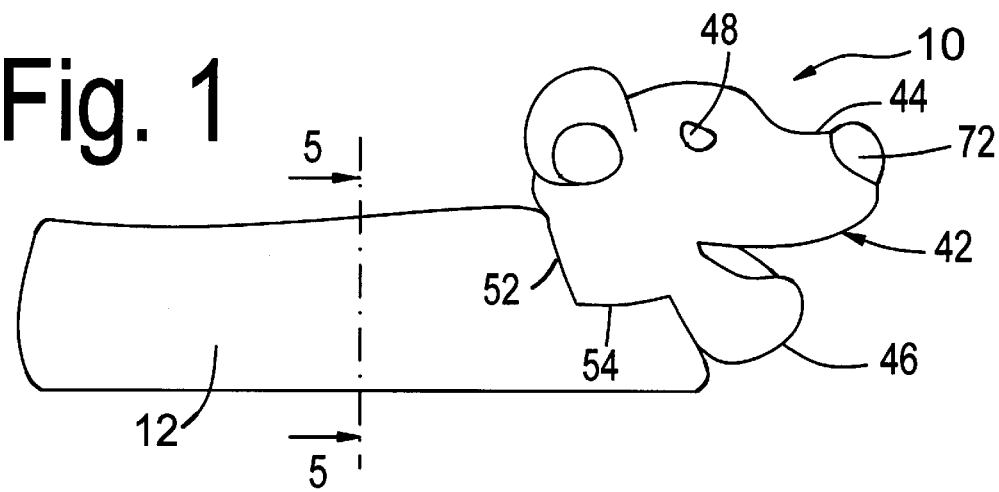
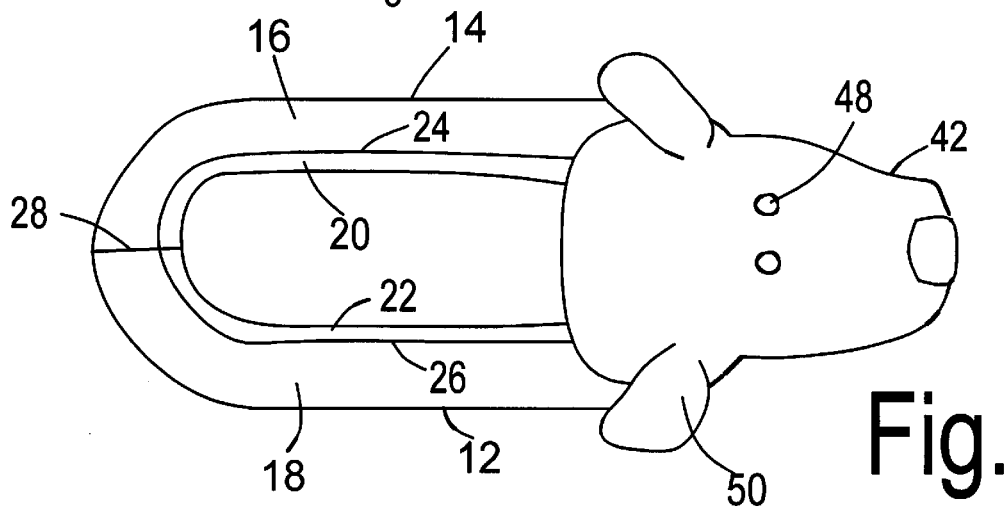

SLIPPER WITH MUSICAL AND RHYTHMIC STIMULATION

This application claims the benefit of Provisional No. 60/113,393 filed Dec. 23, 1998 and Provisional No. 60/108,305 filed Nov. 13, 1998.

TECHNICAL FIELD

This invention relates to footwear which can be used to train a user to dance.

BACKGROUND

Dancing is a fun, social and healthy pastime desired to be enjoyed by many Americans. However, what stops many people from dancing is the difficulty of learning how to dance. Although there have been countless books and videotapes on dancing, most of these tools are not effective because the user is forever staring at a book or a screen trying to imitate movements shown. Many of theses products, in particular, audio tape and compact discs, are put together with the anticipation that they will be listened to in the course of the person practicing their dancing. Even video tapes are produced with the understanding that the tapes will be used during practice. However, all the user sees is the resulting dance and not the steps used to create the dance. Thus, the user hopelessly imitates the look of the dance rather than the dance itself. Furthermore, in trying to watch a tape, the user loses the feel of dancing to the music and rather vainly tries to memorize steps. Therefore, the best result of this training is that the user somehow manages to learn a few steps which are used ad nauseam on the dance floor. For young children, this process is particularly difficult as a child's attention span is short and paying attention to a video tape while trying to master new dance steps is difficult at best. As a result there are countless dancing schools for both adults and children. Teachers are very good about showing a student how to place his feet. However, many families cannot afford the time and money associated with such lessons. Furthermore, unless the lessons are the very expensive individualized lessons, a student is forced to learn at the pace of the class and thus may not be able to fully master steps.

Thus, there is a need for a system which can be used at an individual's own learning pace. There is also a need for a system which functions respond to the music from the loudspeaker on the shoe or from other musical sources. It is also desirable that the system train the user to dance by training the users brain feet and ears to coordinate and move to the music.

SUMMARY OF THE INVENTION

It is an object of the invention to remedy the deficiencies of the prior art heretofore discussed.

It is a further object of this invention to provide a system for training a user to dance.

It is a further object of this invention to provide a system which can be used at an individual user's pace.

It is a further object of this invention to provide a system which trains a user to dance to music from an outside source.

A training shoe is disclosed. The shoe, preferably a soft shoe such as a slipper is designed to emit audio and/or physical stimuli which assists the user in learning dance or other steps. The shoe comprises electromechanical members which are responsive to electrical output signals to control movement to guide a user to perform the appropriate dance steps. In preferred embodiments, the shoe also comprises a loudspeaker through which music is played. In alternate embodiments, the electromechanical members are responsive to audio stimuli such as the music from the loudspeaker on the shoe or from other musical sources.

More particularly, in accordance with the present invention the inventive item of footwear comprises a footwear base. The footwear base comprises a heel and sole portion. An upper is secured to said footwear base. The upper and the footwear base together form a shoe body configured and dimensioned to be worn on the foot of a person. An electromechanical member is mechanically attached to the shoe body. In accordance with the preferred embodiment, an electronic control circuit having at least one electrical output terminal is provided. The electrical output terminal provides its own electrical output signal and the electromechanical member is responsive to the electrical output signal. The result is a mechanical movement adapted to be felt by the person wearing the inventive item of footwear. The inventive system can further comprise an information storage device coupled to the electronic control circuit. The information storage device is coupled to the electronic control circuit and sends a block of information to the electronic control circuit. The block of information is transformed into the electrical output signal output by the electrical output and coupled to the electromechanical member to create the mechanical movement which is adapted to be felt by the person wearing the item of footwear. In alternate embodiments, the shoe is responsive to other shoes so that the beats are synchronized.

The system of the present invention is believed to be particularly advantageous, in so far as it provides for a very direct coupling of information to that part of the body which must be used to dance. More particularly, in accordance with the invention, the foot which is doing the dancing is stimulated directly. Such stimulation may be to one foot or to both feet. The slippers are synchronized to each other by infrared or other means. This is mentally a much easier process to implement for the user. In particular, the user is used to receiving tactile information and synchronizing movements to the song. For example, during walking, tactile information is coupled to the heel and toe and this is fed back to the brain along well-established paths to cause the user to synchronize his movements to the terrain, thus enabling him to easily and quickly execute highly refined movements and walk over sometimes irregular and difficult terrain. In other words, the body is practiced, evolved and developed to receive tactile information from the foot to control foot movement. This natural ability of body and the brain is taken advantage of in accordance with the invention by providing tactile stimulation with dance movement information directly to the foot which a body can most easily assimilate. The result is improved training. At the same time, the activity is also very easy for the body, making the training enjoyable. Thus, even children, perhaps with minimal interest in learning to dance, will be attracted to practice more.

The above action of the system of the present invention is enhanced by the playing of music in the slipper synchronous with the beat. This makes the activity very enjoyable because children love to listen to music.

In accordance with a further embodiment of the invention, infrared sensors may be included with a quality stereoability system to produce the information and transmit the same to infrared receivers on the slippers. Such beat information may be contained on dedicated tracks synchronized to the music information on special-purpose compact discs. The system may be implemented most easily on a computer because of the multitasking capability of the computer. In accordance with yet a further refinement of this embodiment of the invention, the system may include logic circuitry for developing the information from any compact disc or other source of music.

Still yet another advantage of the inventive system is that the same may be used to implement physical therapy or other training regimens. Children are particularly difficult to engage in such activities even in the face of what could be very substantial handicaps that could follow them for the rest of their lives. The result is that trainers and rehabilitation professionals must go to great efforts to be certain that that the child will follow the prescribed regimen. Because, in accordance with present invention, the regimen is presented in an attractive and fun fashion to the child, compliance becomes much easier and more effective. Indeed, it would be expected, if the regimen were tied to music in which the child was interested, a compliance and exercising far above compliance would be the result.

The shoe may also be used for other non-dance training purposes. For example, the shoe may be programmed to teach fencing steps or soccer dribbling. In such as a case sensors for sensing a soccer ball would also be useful.

BRIEF DESCRIPTION OF THE DRAWINGS

Some embodiments of the invention will now be described in detail, by way of example, with reference to the accompanying drawings which illustrate the invention.

FIG. 1 is a side view of a slipper incorporating a toe thumping rhythm simulator and music source in accordance with the present invention;

FIG. 2 is a bottom view of the slipper of FIG. 1;

FIG. 3 is a top of view of the inventive slipper illustrating a nonskid sole surface;

DETAILED DESCRIPTION OF THE PREFERRED EMBODIMENTS

Figure 4:
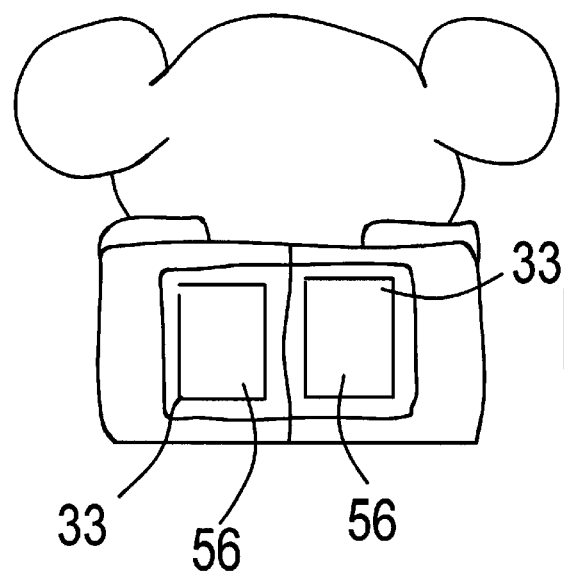
FIG. 4 is a rear view of the slipper of FIG. 1.

In accordance with the present invention, a dancing slipper 10, as illustrated in FIGS. 1–6, is provided. Slipper 10 comprises a pair of sidewalls 12 and 14, which are each formed by respective outer plush material panels 16 and 18, and respective inner flannel panels 20 and 22, as illustrated most clearly in FIG. 2. As is apparent from the illustration of slipper 10 in FIG. 2, the outer plush material panels 16 and 18 are sewn to the inner flannel panels along seams 24 and 26. Inner flannel panels 20 and 22 are joined at a seam 28.

Figure 5:
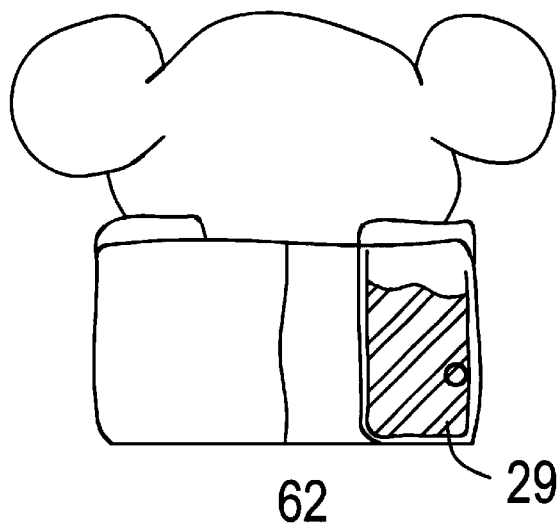
FIG. 5 is a rear view of the slipper of FIG. 1, partially in cross section, showing the composition of the side walls of the slipper.

Referring to FIG. 5, a synthetic fiberfill material 29 is positioned in a cushion like structure defined between outer plush material panel 16 and inner flannel panel 20. In FIG. 5, a portion of slipper 10 is shown in cross-section, cut along line 5—5 of FIG. 1. Likewise, such fiber-fill material is positioned in the cushion-like structure defined between outer plush material panel 18 and inner flannel panel 22. The result is to provide soft and comfortable sidewalls for slipper 10, while at the same time providing for enough compressibility to allow the slipper 10 to fit properly on feet having a wide range of foot sizes. Fiberfill material 29 is very compressible, while at the same time being stiff enough to provide the desired form. In principle, polyurethane foam may be substituted for such fiberfill material, although the compressible and light characteristics off modern synthetic fiberfill materials is preferred. Materials typically have fibers with a thickness in the range of 0.0005–0.002 cm, preferably 0.001 cm, although, of course, a wide range of such fiberous materials will work, and the same may be selected for their being comfortable and structurally acceptable.

While a wide range of materials may be used, typically, the material of which panels 16 and 18 are made is a synthetic plush material having a knitted backing and a dense plush facing made of fibers having a length on the order of 0.3 cm. It may also be desirable that this material have a limited amount of stretch. Alternatively, this plush material may be any of the types typically used in plush toy stuffed animals.

Likewise, the material of which inner flannel panels is made can vary widely, being comprised of cotton flannel, synthetic flannel material, synthetic corduroy, cotton corduroy, velveteen, or a knitted backing material with a flannel-like facing. In accordance with the preferred embodiment, such a knitted material having a thickness of 0.1 cm is employed.

Referring to FIG. 3, the construction of inventive slipper 10 may be further understood. In particular, the structural portion of the structure of slipper 10 is completed by a sole 30. Sole 30 comprises a fabric backing 32 with non-skid rubber gripping members 34 adhered to fabric backing 32.

A pair of pockets 33, as illustrated in FIG. 4, are accessible through a closeable opening 35. Opening 35 may be closed by flexible fabric hook and loop closures, such as those marketed under the trademark Velcro. Alternatively, a zipper or a number of buttons may be used to perform the same function. Pockets 33 are used to house a battery to power the system, as is detailed more fully below.

Figure 6:
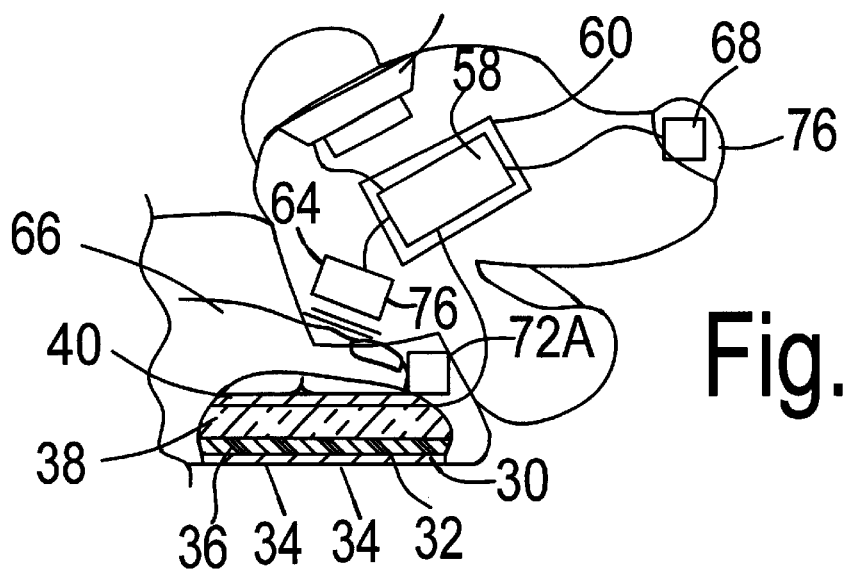
FIG. 6 is a diagram illustrating the composition of the sole of the slipper illustrated in FIG. 1 and the position of the various electromechanical, electrical and electronic components.

As is illustrated most clearly in FIG. 6, the bottom of slipper 10 comprises, in addition to sole 30, a number of other layers. These layers include a rubber inner sole 36, which is made of the relatively firm rubber, which bends substantially without resistance during walking, while, at the same time being soft enough to be compressed under the pressure of, for example, the foot of a child during normal walking. Inner sole 36, in accordance with the preferred embodiment, has a thickness of approximately 0.25 cm.

The next layer in the bottom of the shoe is a foam sole 38. Foam sole 38 is made of a very light, very compressible foam material which is soft enough to be compressed to about 20 percent of its original thickness by the weight of a small child. It has a thickness of about 8 cm, and may be made of polyurethane or any suitable material. Finally, positioned over foam sole 38 is a liner 40, which is made of the same material as inner flannel panels 20 and 22.

In the preferred embodiment, the backing member 32 of sole 30 is glued to rubber inner sole 36. Rubber inner sole 36 is, in turn, glued to foam sole 38. The overall integrity of the bottom of slipper 10 is maintained by sewing liner 40 to backing member 32, inner sole 36 and foam sole 38. Sewing is performed around the periphery of the members, all of which share a substantially oval configuration as illustrated, with respect to sole 30, in FIG. 3.

In order to make the inventive slipper more appealing to those with a playful nature, the front of slipper 10 is decorated with a sculptural form 42. In accordance with the preferred embodiment of the invention, sculptural form 42 is in the head of an animal having a snout 44, a lower jaw 46, eyes 48 and ears 50. Sculptural form 42 is sewn to the top of the front of slipper 10 along seams 52 and 54.

In accordance with the present invention, slipper 10 is provided with music playing and rhythm beating features. The same are powered by a pair of battery packs 56 housed in pockets 33, as illustrated in FIG. 4. Battery packs 56 house batteries, not illustrated in the drawing. In accordance with the preferred embodiment, music and rhythm information are provided by a silicon chip 58 on a circuit board 60 which also hosts electronic circuitry supporting chip 58.

Chip 58 drives an amplifier which in turn drives a loudspeaker 62. Music from the loudspeaker 62 penetrates and exits the plush fabric of which form 42 is made. Rhythm information is sent to a thumper 64 which couples a mechanical beat to a foot 66 of a user as will become apparent from the description which follows below.

Figure 7:
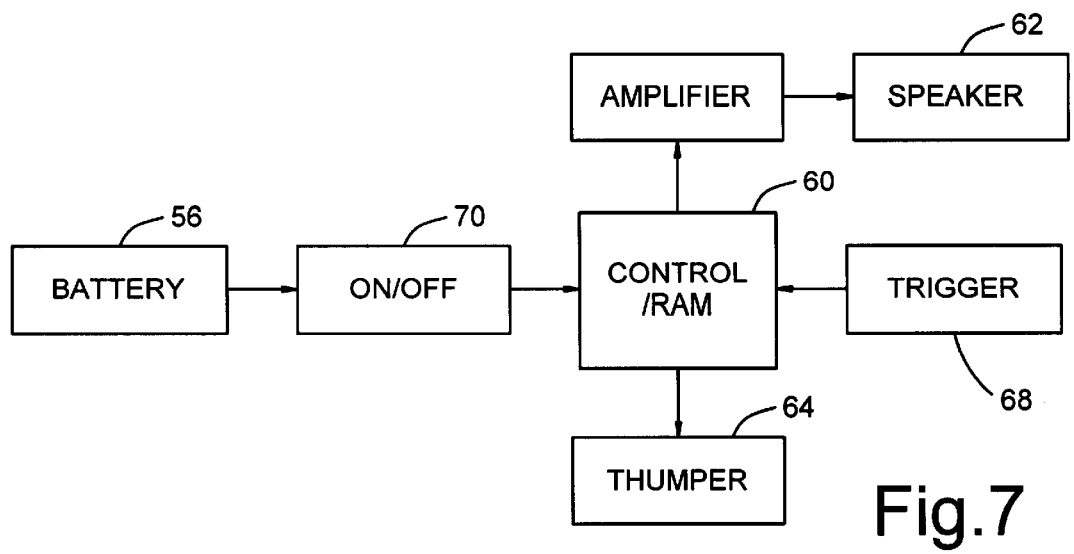
FIG. 7 is a block diagram of the electronic system used in the slipper of FIG. 1.

The output of music to loudspeaker 62 and thumper 64 is triggered by an electrical trigger switch to 68. Switch 68 is located in the nose 72 of the animal head decorating the front of the shoe. As is illustrated in FIG. 7, the entire system may be turned on and off by a simple on/off switch 70. Electrical connections between these parts are illustrated in FIG. 7.

As illustrated in FIG. 7, battery 56 supplies power to the system. Power is turned on and off by switch 70, which, in the "on" position, couples power to circuit board 60. When trigger 68 is actuated, for example by the tweaking or pinching of nose 72, chip 58 on board 60 outputs music to amplifier 74 which, in turn, drives loudspeaker 62. Alternatively, a switch 72a may be located adjacent the toe portion of slipper 10 and the music will be triggered by the wearer putting on the slipper, or be continued when the wearer walks in slipper 10.

The music can be of any type or duration. For example, the music can be an excerpt from a commercial recording including vocal and instrumental elements. In such a case, the chip would have to be selected to have a substantial capacity in random access memory. However, power consumption could be reduced by storing only a limited number of sounds and playing them back in a desired sequence and at speeds corresponding to the notes of the music which is desired to be played. Respecting duration, in accordance with the preferred embodiment, it is contemplated that music will be played for a limited period of time, for example a time period on the order of ten seconds.

Figure 8:
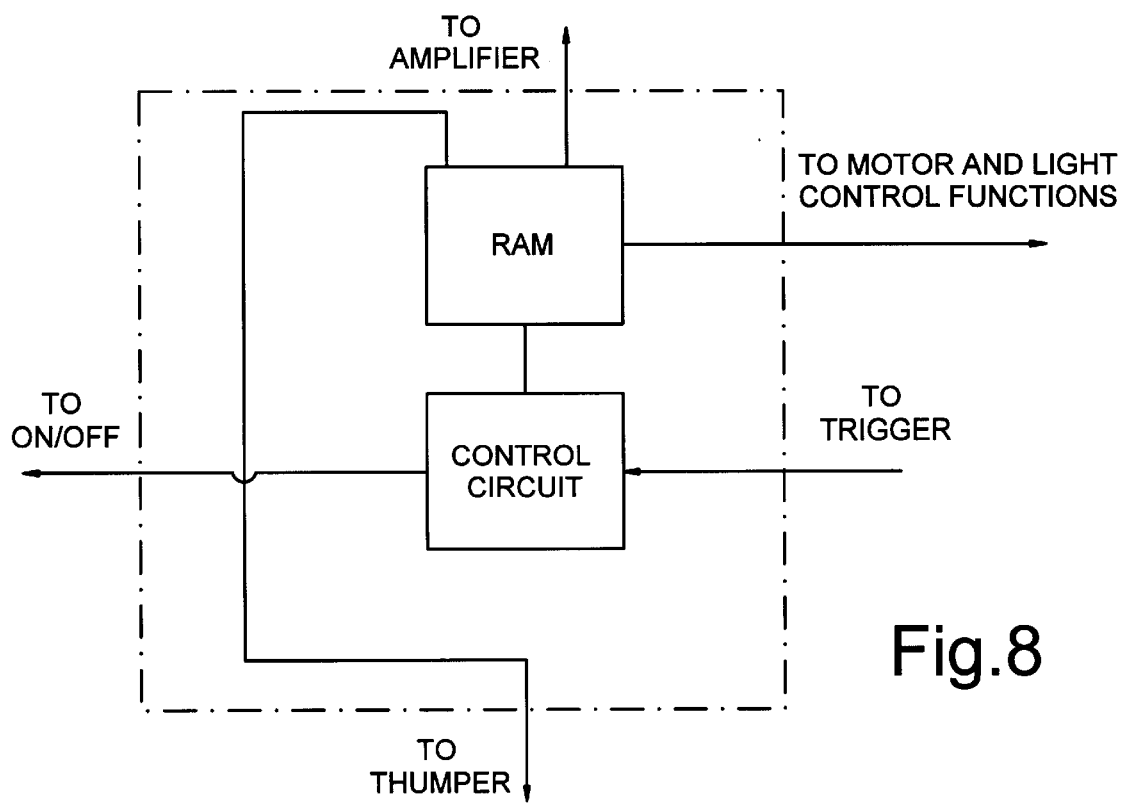
FIG. 8 is a block diagram of the control circuit in FIG. 7.

Also, as can be understood from FIG. 8, stored in RAM on chip 58 is a rhythm pattern that comprises a series of beats, whose timing pattern is keyed to the music stored in RAM, much in the same way that the elements in a dance step correlate to music in the same genre as the dance step.

More particularly, RAM contains musical information to be played through loudspeaker 62 and a series of beats, timed to follow the music and sent to thumper 64. While the mechanical beats output by thumper 64 may be a simple series of uniformly spaced beats, in accordance with the preferred embodiment, the sequence may be irregular for a period of time then repeated and/or varied. The effect may then be to follow a known or new percussive beat, such as a paradiddle, five beat roll, or the like.

Figure 9:
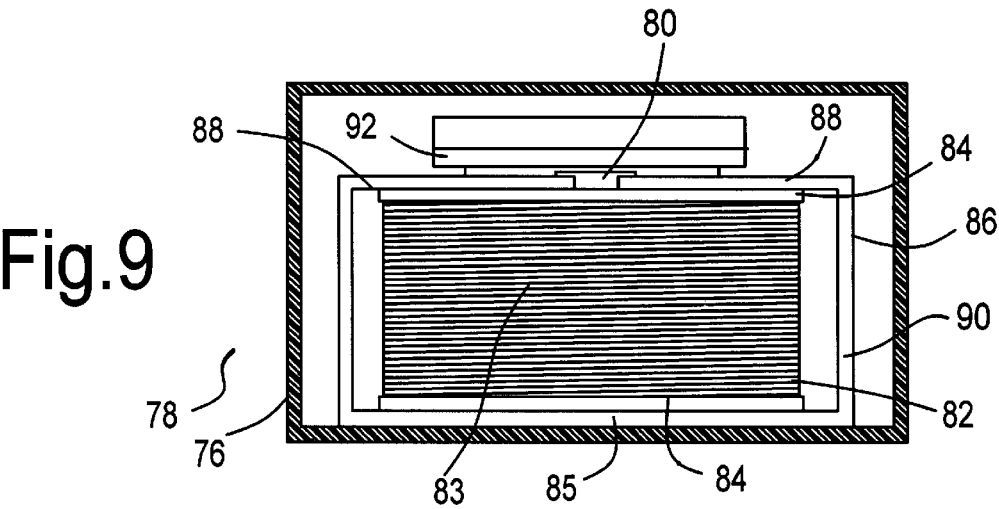
FIG. 9 is a front view of a transducer for providing a thump to the toe of a user.
Figure 10:
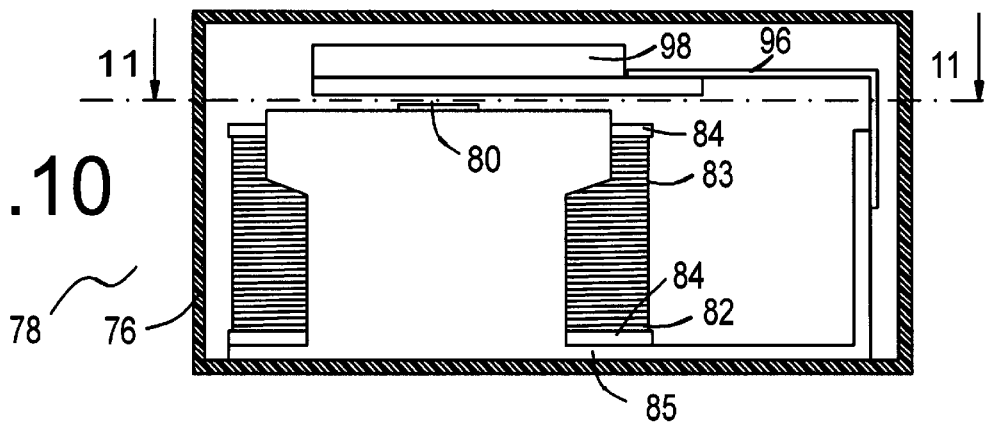
FIG. 10 is a side view of the transducer illustrated in FIG. 9.

The mechanical beat output by thumper 64 is provided by an electromagnetic transducer housed in a plastic box 76. Referring to FIGS. 9 and 10, transducer 78, generally comprises a magnetic core 80, around which copper wire 82, contained between spool ends 84, has been wound. The result is to form an electromagnet comprised of core 80 and wire 82. Wire 82 forms a winding 83. The ends of the copper wire 82 are driven with an electrical signal output by microprocessor chip 58. In accordance with the preferred embodiment, this signal may be amplified by a switching transistor.

Figure 11:
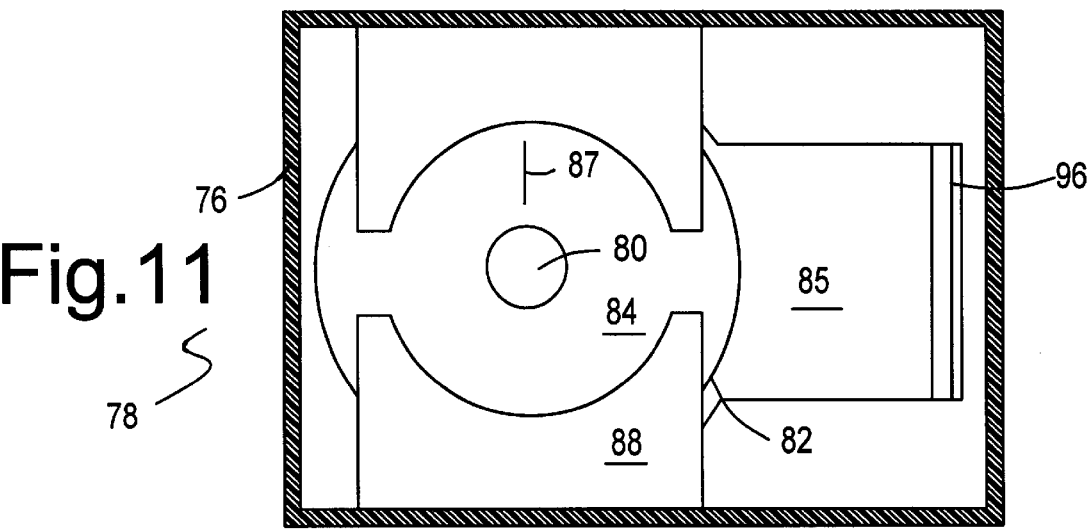
FIG. 11 is a cross sectional view along lines 11—11 of FIG. 10.

The electromagnet is supported between the base 85 of support member 86 and the tops 88 of the arms of support member 86. Reference is made to FIG. 11 which is a cross sectional view along lines 11—11 of FIG. 10. A substantial gap 87 is defined by the tops 88 of support member 86. The purpose of this gap is to interrupt what would otherwise be a path for flux to circulate through the side portions 90 of support member 86, and thus to concentrate the flux in paths which include electromagnetic member 92.

Magnetic flux created by the electromagnet is coupled through portion 94 of support member 86, and then through spring member 96 and electromagnetic member 92. When an electrical pulse is applied to copper wire 82 of the electromagnet, electromagnetic member 92 is attracted toward core 80. However, the size of the electrical pulse provided by chip 58 is scaled to result in attraction of electromagnetic member 92, but not so great as to result in contact between electromagnetic member 92 and core 80.

Additional mass is provided by bob member 98 which is secured to electromagnetic member 92. This results in a stronger thump being coupled to the foot of the user.

In accordance with the preferred embodiment of the invention, this thump is coupled to the toes of the user, which are most sensitive to such movement. Likewise, loudspeaker 62 is oriented upwardly to provide a maximum of acoustic energy in the direction of the user. Because of the rhythm of the thumping and the music are correlated to each other, and the thumping is on the foot, the result is to induce and train dancing by a child or other person using the inventive slipper 10.

The inventive slipper is particularly effective inasmuch as it concentrates a mechanical beat signal on the foot of a user, while providing a musical stimulus to the ears of the user. This combination is most natural as is illustrated, for example, by the familiar substantially involuntary toe tapping which occurs when people hear music. In accordance with the preferred invention, music which has a high beat content is particularly preferred.

In accordance with the present invention, it is contemplated that the slippers or other footwear of multiple users may be made responsive to each other. Such responsiveness may be provided by linking slippers using infrared transmitters and receivers on the slippers. Such responsiveness may take the form of the slipper music and thumper beats synchronized to each other, or other temporal relationship between the beat and the music.

Moreover, if desired, the random access memory contained in chip 58 may be used to contain other information input into the ram in the same way as music or beat information in a conventional fashion which is not a part of the present invention. Such information may include, for example, information which would cause the animal head of sculptural form 42 to nod up and down with the music or, do something completely different like light up eyes 48 in synchronism with the beat and/or the music.

In accordance with the present invention, it is also contemplated that the musical output can be replaced by a giggling sound or the sound that a child might give out if tickled. Such sounds may be timed to the beat of the thumper in such a way that giggling may be likely triggered in children wearing the slippers.

It is also contemplated that the system of the present invention can be implemented in a shoe, sneaker, dancing shoe or other similar environment or item. In the case of a sneaker, the beat in the sneaker can be timed to correspond to a desired pattern of a physical activity, in much the same way that an audio cue is given to a number of rowers in a boat or the cheer of the crowd urging a charging quarterback with a repetitive "go, go, go". Likewise, the music can be replaced with different content, such as a cheer or a training input, such as "right, breathe in, left, breathe out". Such stimuli may be produced by one or both the shoes of an individual. In similar fashion, the audio component may be dispensed with, and the beat on the foot of the user made the only stimulus output by the sneaker.

In the case of an athletic sneaker, it is contemplated that the beat applied by the sneaker may optionally be controlled by a source external to the shoe. Such input may be a remote control from a coach, trainer or other person. Alternatively, the beat in the shoe or shoes of a user may be made responsive to the beat of a designated lead user in a group of users.

In principle, a fixed designated user can be replaced by a dynamic shifting user, selected by the shoes of all users as a result of communication of, for example, running characteristics of the various users, through the use of motion sensors and infrared links between the shoes. The microprocessors may be made responsive to increasing speed of one runner to increase the beat frequency sent to the other runners, or it could be responsive to faltering in the motion of one of a group of runners to slow down the group, to allow all to finish the course. Such information may also be downloaded to a computer, to allow the formation of more evenly matched groups or to achieve other characteristics in a group.

While some illustrative embodiments of the invention have been described above, it is, of course, understood that various modifications will be apparent to those of ordinary skill in the art. Such modifications are within the spirit and scope of the invention, which is limited and defined only by the appended claims.

What is claimed is:

1. An item of footwear, comprising:
   (a) a footwear base, comprising a heel and sole portion;
   (b) an upper secured to said footwear base, said upper and said footwear base together forming a shoe body configured and dimensioned to be worn on the foot of a person;
   (c) an electromechanical member, mechanically attached to said shoe body;
   (d) an electronic control circuit having at least one electrical output terminal, said electrical output terminal providing a respective electrical output signal, said electromechanical member responsive to said electrical output signal output by said electrical output terminal to create a mechanical movement adapted to be felt by said person wearing said item of footwear; and
   (e) an information storage device coupled to said electronic control circuit, said information storage device being able to send a block of information to said electronic control circuit, said block of information being transformed into said electrical output signal output by said electrical output and coupled to said electromechanical member to create said mechanical movement adapted to be felt by said person wearing said item of footwear.

2. An item of footwear as in claim 1, further comprising a loudspeaker and wherein said block of information comprises music information and beat information having a defined temporal relationship with respect to said music information, said music information being provided as a signal to said loudspeaker.

3. An item of footwear as in claim 1, further comprising:
   (f) second output terminal on said control circuit; and
   (g) a loudspeaker coupled to said second output terminal on said control circuit, wherein said block of information comprises music information and beat information associated with said music information, said music information being provided at said second output terminal as a signal to said loudspeaker.

4. An item of footwear as in claim 3, capable of communication with a second item of footwear having similar characteristics, said item of footwear and said second item of footwear each further comprising:
   (h) a respective signal emitting device driven by its respective control circuit to periodically emit a signal indicating operation of said respective control circuit; and
   (i) a respective signal receiving device for receiving a respective signal from the other control circuit in the other item of footwear, said signal receiving device being coupled to its respective control circuit, and said respective control circuit being responsive to a received signal from the other control circuit in the other item of footwear to cause said signal emitting device to transmit a signal indicating that said control circuit and said second control circuit are in communication with each other, and said control circuits in both said items of footwear in communication with each other are responsive to the existence of said communication to transition to a state where said block of information in said item of footwear and said block of information in said second item of footwear are output by their respective control circuits having a defined temporal relationship with respect to each other.

5. An item of footwear as in claim 4, wherein said signal emitting device and said signal receiving device are radio frequency devices.

6. An item of footwear as in claim 1, wherein said electromechanical member is mechanically attached to said second shoe body at a position where said electromechanical member is in contact with a portion of the foot of the user other than the bottom of the foot.

7. An item of footwear as in claim 1, wherein said signal emitting and signal receiving devices are infrared devices.

8. An item of footwear as in claim 7, wherein said electromechanical member is mechanically attached to said second shoe body at a position where said electromechanical member is in contact with a portion of the foot of the user other than the bottom of the foot.

9. Two items of footwear intended to be worn by different feet at the same time, comprising:
   (I) a first item of footwear, comprising:
      (a) a first footwear base, comprising a first heel portion and a first sole portion;

(b) a first upper secured to said first footwear base, said first upper and said first footwear base together forming a first shoe body configured and dimensioned to be worn on the foot of a person;

(c) a first electromechanical member, mechanically attached to said first shoe body;

(d) a first electronic control circuit having a first beat electrical output terminal, said first beat electrical output terminal providing a first respective electrical output signal, said first electromechanical member responsive to said first electrical output signal output by said first electrical output to create a first mechanical movement adapted to be felt by the person wearing said item of footwear;

(e) a first information storage device coupled to said first electronic control circuit, said first information storage device being coupled to said first electronic control circuit to send a first block of information to said first electronic control circuit, said first block of information being transformed into said first electrical output signal output by said first electrical output and coupled to said first electromechanical member to create said first mechanical movement adapted to be felt by said person wearing said first item of footwear;

(f) a first music output terminal on said first control circuit;

(g) a first loudspeaker coupled to said first music output terminal on said first control circuit, said first block of information comprising music information and beat information associated with said music information, said music information being provided at said first music output terminal as a signal to said first loudspeaker;

(h) a first infrared signal emitting device driven by said first control circuit to periodically emit a signal indicating operation of said first control circuit; and (i) a first infrared signal receiving device for receiving a signal from another control circuit in another item of footwear, said first signal receiving device being coupled to said first control circuit, and said first control circuit being responsive to a received signal from the other control circuit in the other item of footwear to cause said first signal emitting device to transmit a signal indicating that said first control circuit and the control circuit in said other item of footwear are in communication with each other, and said first and second control circuits being responsive to the existence of said communication to transition to a state where said block of information in said first and second items of footwear are output by their respective control circuits having a defined temporal relationship with respect to each other; and (II) a second item of footwear, comprising:

(a') a second footwear base, comprising a second heel portion and a second sole portion;

(b') a second upper secured to said second footwear base, said second upper and said second footwear base together forming a second shoe body configured and dimensioned to be worn on the foot of a person;

(c') a second electromechanical member, mechanically attached to said second shoe body;

(d') a second electronic control circuit having a second beat electrical output terminal, said second beat electrical output terminal providing a second respective electrical output signal, said second electromechanical member responsive to said second electrical output signal output by said second electrical output to create a second mechanical movement adapted to be felt by the person wearing said item of footwear;

(e') a second information storage device coupled to said second electronic control circuit, said second information storage device being coupled to said second electronic control circuit to send a second block of information to said second electronic control circuit, said second block of information being transformed into said second electrical output signal output by said second electrical output and coupled to said second electromechanical member to create said second mechanical movement adapted to be felt by said person wearing said second item of footwear;

(f') a second music output terminal on said second control circuit;

(g') a second loudspeaker coupled to said second music output terminal on said second control circuit, said second block of information comprising music information and beat information associated with said music information, said music information being provided at said second music output terminal as a signal to said second loudspeaker;

(h') a second infrared signal emitting device driven by said second control circuit to periodically emit a signal indicating operation of said second control circuit; and (i') a second infrared signal receiving device for receiving a signal from another control circuit in another item of footwear, said second signal receiving device being coupled to said second control circuit, and said second control circuit being responsive to a received signal from the other control circuit in the other item of footwear to cause said second signal emitting device to transmit a signal indicating that said second control circuit and the control circuit in said other item of footwear are in communication with each other, and said first and second control circuits being responsive to the existence of said communication to transition to a state where said block of information in said first and second items of footwear are output by their respective control circuits having a defined temporal relationship with respect to each other.

10. Two items of footwear as in claim 9, wherein said first and second electromechanical members are mechanically attached to said second shoe body at a position where they are in contact with a portion of the foot of the user other than the bottom of the foot.

11. Two items of footwear as in claim 9, wherein each of the items of footwear is adapted to be worn by a different person.

12. An item of footwear comprising electromechanical members which are responsive to electrical output signals to control movement to guide a user to perform foot movements.

13. An item of footwear according to claim 12 further comprising a loudspeaker through which music is played.

14. An item of footwear according to claim 12 wherein the electromechanical members are responsive to audio stimuli.

15. An item of footwear, comprising:

(a) a footwear base, comprising a heel and sole portion;

(b) an upper secured to said footwear base, said upper and said footwear base together forming a shoe body configured and dimensioned to be worn on the foot of a person;

(c) a movable electromechanical member, mechanically attached to said shoe body and movable in a manner detectable by the wearer's foot;
(d) an electronic control circuit providing an electrical output signal to move the electromechanical member; and
(e) an information storage device coupled to said electronic control circuit to provide information to said electronic control circuit regarding a desired pattern of movements for said electromechanical member, said information being readable in said electrical output signal and said desired pattern of movements being perceptible by the wearer's foot and being intended to train the wearer to perform a predetermined set of foot movements.

16. An item of footwear as in claim 15, further comprising a loudspeaker, wherein said electrical output signal further comprises music information and beat information, said beat information being associated with said music information, said music information being provided as a signal to said loudspeaker.

17. An item of footwear as in claim 15, wherein said electromechanical member contacts a plurality of locations on the wearer's foot.

18. An item of footwear as in claim 15, wherein said signal emitting and signal receiving devices comprise infrared devices.

* * * * *